Oct. 16, 1951     O. V. JOHNSON     2,571,139
ANGULARLY ADJUSTABLE BEACH SEAT
Filed April 27, 1948
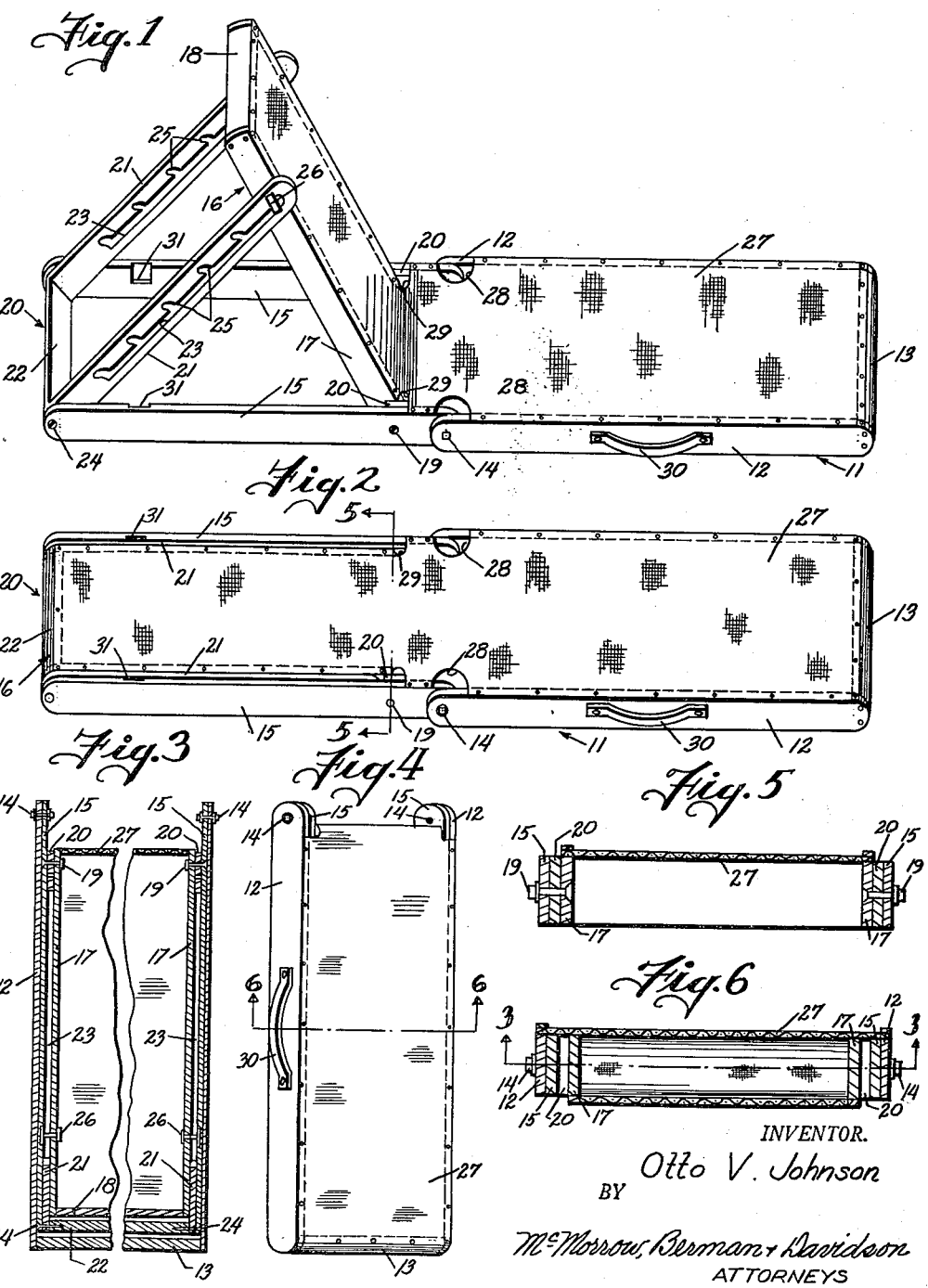
INVENTOR.
Otto V. Johnson
BY
McMorrow, Berman + Davidson
ATTORNEYS Patented Oct. 16, 1951

2,571,139

UNITED STATES PATENT OFFICE 2,571,139

ANGULARLY ADJUSTABLE BEACH SEAT

Otto V. Johnson, Gardner, Mass.

Application April 27, 1948, Serial No. 23,510

1 Claim. (Cl. 155—154)

This invention relates to back rests, and more particularly to a portable back rest which is foldable to a very compact size and which is especially useful outdoors.

A main object of the invention is to provide a novel and improved portable back rest for use at beaches or other outdoor locations, said back rest being simple in construction, easy to adjust and which gives proper support to the back of the user.

A further object of the invention is to provide an improved portable back rest of the foldable type which is inexpensive to manufacture, sturdy in construction and light in weight, whereby it may be readily carried from place to place as required.

Further objects and advantages of the invention will become apparent from the following description and claims and from the accompanying drawings, wherein:

Figure 1 is a perspective view of a portable back rest constructed in accordance with the present invention, the back rest being shown set up for use.

Figure 2 is a perspective view similar to Figure 1 showing the back rest arranged in a flat position for use as a bed.

Figure 3 is a longitudinal cross-sectional view taken through the back rest arranged in folded position, said view being taken on line 3—3 of Figure 6.

Figure 4 is a perspective view of the folded back rest.

Figure 5 is an enlarged vertical transverse cross-sectional view taken on line 5—5 of Figure 2.

Figure 6 is an enlarged cross-sectional view taken on line 6—6 of Figure 4.

Referring to the drawings, 11 designates the main outer frame of the back rest, said frame comprising a pair of parallel longitudinal bar members 12, 12 rigidly connected by a transverse bar member 13 at one end of said outer frame 11. Pivotally connected to the other ends of bar members 12, 12, as by pivot bolts 14, inwardly adjacent bar members 12, 12 are the ends of additional longitudinal bar members 15, 15.

Designated at 16 is an inner frame comprising parallel bar members 17, 17. At one end of inner frame 16 the bar members 17, 17 are rigidly connected by a transverse bar member 18. The other ends of bar members 17, 17 are pivotally connected to the bar members 15, 15 by pivot bolts 19, 19, spacer blocks 20, 20 being interposed between the bar members 17, 17 and the bar members 15, 15 at said pivotal connections.

Designated at 20 is a brace frame comprising side bars 21, 21 rigidly connected at one end of said frame by a transverse bar 22. Frame 20 is pivotally connected at bar 22 by bolts 24 to the ends of bars 15, 15 inwardly thereof. Bars 21, 21 are formed with longitudinal slots 23, said slots being formed with transversely aligned spaced catch recesses 25. Secured to bars 17, 17 are outwardly projecting headed studs 26, 26, received in the slots 23, 23 of bars 21, 21 and cooperable with the catch recesses 25 to support frame 16 in any one of a plurality of different angular positions with respect to frame 11.

Fastened to the top edges of the respective bar elements of the frame 11 and 16 is a flexible sheet 27 of canvas or other sturdy fabric, the sheet 27 being arcuately notched at 28, 28 and 29, 29 to allow the fabric to be freely folded around the pivoted joints adjacent thereto. Secured to the intermediate portion of one of the bar members 12 is a carrying handle 30.

The inner wall surfaces of bar member 15, 15 are formed with recesses 31, 31 to receive the heads of the studs 26, 26 when the device is arranged in a flat position, as shown in Figure 2.

Figure 1 illustrates the positions of the parts when the device is adjusted for use as a back rest. The frame 16 is securely supported in its angled position by the arms 21, 21 of the brace frame 20. When it is desired to adjust the device for use as a bed, the studs 26, 26 are disengaged from the catch recesses 25 and frames 16 and 20 are rotated downwardly, frame 16 nesting within frame 20, whereby the parts assume the positions shown in Figure 2.

When the device is to be folded for transportation or storage, the parts are first arranged in the positions shown in Figure 2 and frame 11 is then rotated clockwise, as viewed in Figure 2, around the pivot bolts 14, 14, the bar members 15, 15 nesting within frame 11, whereby the parts assume the positions shown in Figures 3 and 4. The folded unit of Figures 3 and 4 is very compact and is convenient to carry.

While a specific embodiment of a portable back rest device has been disclosed in the foregoing description, it will be understood that various modifications within the spirit of the invention may occur to those skilled in the art. Therefore it is intended that no limitations be placed on the invention except as defined by the scope of the appended claim.

What is claimed is:

A portable beach rest comprising a first substantially U-shaped frame including side bars, a pair of elongated substantially parallel bars disposed adjacent to the inner sides of the side bars of the first U-shaped frame and including inner and outer ends, the inner ends of said elongated bars being pivotally connected with the free ends of the side bars of the first U-shaped frame, spacer blocks secured to the inner sides of said elongated bars adjacent to their inner ends, a second substantially U-shaped frame extending longitudinally of the first U-shaped frame and including substantially parallel side rails disposed adjacent to the inner faces of the spacer blocks, the free ends of said side rails being pivotally connected with said spacer blocks and said elongated bars at points near and spaced longitudinally from the free ends of the side bars of the first U-shaped frame, a third U-shaped frame including side bars arranged adjacent to the inner faces of said elongated bars and adjacent to the outer faces of the side rails of the second U-shaped frame, the third U-shaped frame having inner and outer ends, the outer end of the third U-shaped frame being pivotally connected with the outer ends of the elongated bars, the side bars of the third U-shaped frame being foldable into stowed positions between the elongated bars and the side rails of the second U-shaped frame, adjustable means connecting the side rails of the second U-shaped frame and side bars of the third U-shaped frame so that the angle of inclination of the second U-shaped frame may be varied, and a flexible fabric sheet secured to adjacent longitudinal edges of the first and second U-shaped frames and provided with openings adjacent to the inner ends of said elongated bars so that the elongated bars may be folded inwardly of the side bars of the first U-shaped frame for collapsing the beach rest.

OTTO V. JOHNSON.

REFERENCES CITED

The following references are of record in the file of this patent:

UNITED STATES PATENTS

| Number | Name | Date |
|---|---|---|
| 172,281 | Seng | Jan. 18, 1876 |
| 1,151,894 | Meinecke | Aug. 31, 1915 |

FOREIGN PATENTS

| Number | Country | Date |
|---|---|---|
| 153,394 | Great Britain | Nov. 11, 1920 |
| 244,874 | Italy | Feb. 13, 1926 |